2,750,388

DERIVATIVES OF ISONICOTINIC ACID HYDRAZIDE

Harry L. Yale, New Brunswick, N. J., assignor to Olin Mathieson Chemical Corporation, New York, N. Y., a corporation of Virginia No Drawing. Application October 16, 1952, Serial No. 315,185

12 Claims. (Cl. 260—294.9)

This invention relates to, and has for its object the provision of, certain cyano-substituted N-(heterocyclic acyl)-hydrazines and acid-addition salts of those hydrazines having a basic nitrogen atom, and methods for their preparation. These compounds are valuable chemotherapeutic agents, having antimycobacterial (especially antituberculous) properties.

The compounds of this invention (in free-base form) are those of the general formula

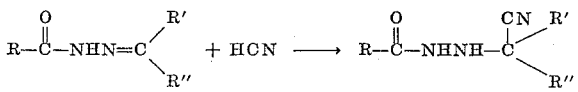

wherein R is a heterocyclic radical, and each of R' and R" is hydrogen, alkyl, substituted alkyl, aryl or, together, are part of a cyclic nucleus.

These compounds (in free-base form) may be prepared by reacting the selected hydrazone of a heterocyclic carboxylic acid hydrazide with hydrogen cyanide, and isolating the reaction product. Graphically, the reaction may be represented as follows:

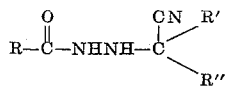

wherein R, R' and R" have the meaning given hereinbefore.

The utilizable hydrazone reactants include, inter alia (1) hydrazones of hydrazone-forming carbohydrates (which are the subject-matter of U. S. Patent No. 2,726,-983, granted December 13, 1955), (2) pyridine carboxylic acid hydrazones of alkyl, alkenyl, halo-alkyl, cycloalkyl, and cycloalkenyl aldehydes and ketones (which are the subject-matter of application Serial No. 273,369, filed February 25, 1952, now abandoned), (3) streptomycin hydrazones of monoacyl hydrazides (which are the subject-matter of application Serial No. 274,506, filed March 1, 1952), (4) heterocyclic carboxylic acid hydrazones of aminobenzaldehydes (which are the subject-matter of application Serial No. 275,682, filed March 8, 1952), (5) O- or S-heterocyclic carboxylic acid hydrazones of hydrazone-forming carbohydrates (which are the subject-matter of U. S. Patent No. 2,733,237, granted January 31, 1956), and (6) 2-furoic, 2-thiophene carboxylic and 2-pyrrole carboxylic [as well as their di- and tetrahydro derivatives] acid hydrazones of alkanones, alkanals, cycloalkanones, cycloalkanals, alkenones, alkenals, cycloalkenones, cycloalkenals containing at least six carbon atoms and halo-substituted derivatives thereof (which are the subject-matter of application Serial No. 291,322, filed June 2, 1952). Other utilizable reactants are the hydrazones of the 2- or 5-imidazole-carboxylic acid hydrazides, which are obtainable by reaction of an ester of the 2- or 5- imidazolecarboxylic acid with hydrazine hydrate to form the hydrazide, followed by reaction of the hydrazide with an aldehyde or ketone to produce the desired hydrazone.

Thus, the RCO group may be an acyl residue derived from any heterocyclic acid, such as nicotinic, isonicotinic, isonicotinic-1-oxide, isonipecotic, nipecotic, 2-furoic, 3-furoic, 2-thiophene carboxylic, 3-thiophene carboxylic, dihydrofuroic, tetrahydrofuroic, 2-pyrrole carboxylic, 3-pyrrole carboxylic, 2-pyrrolidine carboxylic, 3-pyrrolidine carboxylic, 2-imidazolecarboxylic and 5-imidazolecarboxylic acids. The

group may be derived from any of the hydrazone-forming aldehydes or ketones. Thus, the group may result from utilization of an alkanal, such as formaldehyde, acetaldehyde, propionaldehyde, isobutyraldehyde, butyraldehyde, valeraldehyde, isovaleraldehyde, caproaldehyde, α-ethylbutyraldehyde, heptaldehyde and stearaldehype; an alkenal, such as citronellal, geranial, citral acrolein and crotonaldehyde; a cycloaliphatic aldehyde, such as cyclohexane carboxaldehyde, cyclohexene carboxaldehyde, cyclopentane carboxaldehyde and cyclopentene carboxaldehyde; and substituted derivatives thereof, such as halo-substituted derivatives (e. g., monochloracetaldehyde, β-brompropionaldehyde, α-bromheptaldehyde, α-bromcaproaldehyde, etc.), and hydroxy-substituted derivatives (e. g., streptomycin, glucose, glyceraldehyde, mammose, galactose, arabinose, sucrose, maltose, lactose, etc.). Also, there may be utilized aromatic aldehydes, such as benzaldehyde, p-ethyl benzaldehyde and m-tolualdehyde, and substituted aromatic aldehydes, such as o-chlorobenzaldehyde, p-chlorobenzaldehyde, m-nitrobenzaldehyde, p-aminobenzaldehyde, salicylaldehyde, p-aminosalicylaldehyde, m-hydroxybenzaldehyde, o-methoxybenzaldehyde, anisaldehyde, p-aminobenzaldehyde and p-dimethylaminobenzaldehyde.

The ketones utilizable to obtain the hydrazone reactants of this invention include alkanones, such as acetone, methyl ethyl ketone, diethyl ketone, hexanone-2, hexanone-3, diamyl ketone, and stearone; alkenones, such as methyl vinyl ketone, mesityl oxide and phorone; cycloaliphatic ketones, such as cyclohexanone, cyclohexenone, cyclopentanone, cyclopentenone and methyl cyclohexanone; and substituted derivatives thereof, such as halo-substituted derivatives (e. g., dichloracetone, 1-chloro-2-heptanone, 1-chloro-2-hexanone, 6-bromo-2-hexanone) and hydroxy-substituted derivatives (e. g. fructose). Aromatic ketones, such as acetophenone, propiophenone, benzophenone; heterocyclic ketones, such as methyl 2-thienyl ketone, methyl 2-furyl ketone and substituted derivatives thereof (e. g., ω-chloracetophenone, ω-bromacetophenone, ω,ω-dibromoacetophenone) may also be used.

Acid-addition salts of those compounds having a basic nitrogen atom (i. e., pyridine carboxylic acid derivatives) should be formed under substantially anhydrous conditions in order to minimize hydrolysis of the nitrile. Thus, hydrochlorides may be prepared by adding etherial hydrogen chloride to a solution of the cyano compound in an inert solvent (e. g., acetonitrile, absolute methanol, absolute ethanol, isopropanol, methyl ethyl ketone, n-butanol, etc.), and then separating the acid-addition salt which forms. Similarly, other salts, such as those of sulfuric acid, phosphoric acid, p-aminosalicylic acid, p-toluenesulfonic acid, methionine, sulfamic acid, lactic acid, citric acid, gluconic acid, etc., may be formed.

The nitrile portion of the molecule may also be subjected to acid hydrolysis (e. g., by treatment with aqueous hydrochloric or sulfuric) or alkaline hydrolysis (e. g., by treatment with alcoholic potash) to form the amide or free acid.

The hydrogen cyanide may be used in the reaction mixture in any convenient form. Thus, although preferably used as a liquid, it may be added as a gas or liberated in situ (as, for example, by adding potassium cyanide and an acid to the reaction mixture). The hydrazones which are not soluble in liquid hydrogen cyanide may be dissolved in an inert solvent (e. g., dimethyl-formamide, n-butanol, etc.) and then added to the liquid cyanide; or gaseous hydrogen cyanide may be passed into the hydrazone solution.

As to reaction conditions, wide variation is permissible. While it is preferable to have an excess of hydrogen cyanide in the reaction medium, stoichiometric amounts of reactants may be used, or the hydrazone may be present in excess.

The compounds of this invention are especially useful as therapeutic agents, e. g., in the treatment of tuberculosis or leprosy, their antimycobacterial activity being high, and their toxicity being remarkably low. Thus, the maximum acceptable level in the diet is about 0.125% for N-isonicotinoyl-N'-(1,1-dimethyl-1-cyanomethyl)-hydrazine, as compared with about 0.032% for isonicotinic acid hydrazide, and accepted antituberculous agent.

The compounds of this invention may be prepared for use by association of a therapeutically-active quantity (at least 0.1%) of the compound with a carrier which is preferably a solid material but which may be a sterile liquid vehicle or a liquid pharmaceutical carrier such as a syrup. Thus, the formulations may take the form of tablets, powder packets, capsules, or other dosage-unit forms which are useful for oral administration. These may be prepared in the conventional manner. For example, two-piece gelatin capsules may be made containing a mixture of the compound and excipient (e. g., starch, talc, stearic acid, magnesium stearate), the compound being present in an amount of the order of about 10 to 100 mg. or more. Also, one-piece gelatin capsules may be prepared containing the desired dosage (e. g., of the order of 10 to 100 mg. or more) of the agent in sufficient corn oil to render the compound capsulatable. Tablets may be prepared to contain of the order of 10 to 250 mg. or more of the agent using starch, lactose or other conventional excipient, and may be scored to enable one to take fractional dosages, if desired. Any of the tableting materials used in pharmaceutical practice may be employed where there is no incompatibility with the particular agent.

The compounds of this invention may also be provided in liquid (solution or suspension) form. Thus, a composition may be prepared to contain about 5 mg. or more of the agent per ml. of liquid pharmaceutical carrier, such as a carbohydrate-containing (e. g., syrup) or an aqueous-alcoholic vehicle; or a sterile parenteral solution may be prepared, for example, by dissolving the agent in water (e. g., about 100 mg./ml.), adding a preservative, such as chlorbutanol (5 mg./ml.), and then ampuling or packaging in multidose vials and sterilizing.

In all compositions where such excipient as lactose is used, sugar-alcohols, such as sorbitol or mannitol, may be substituted.

In addition to their use in man, the compounds of this invention may be used with similar therapeutic effect in animals, such as poultry and cows. For such use, they may take the form of animal feed compositions, such as poultry feed compositions containing at least 0.1 percent of the compound and a significant amount of nutritive material.

Following are specific working examples illustrating, but not limiting, this invention:

EXAMPLE 1

*N-isonicotinoyl-N'-(1,1-dimethylcyanomethyl)hydrazine*

45 g. acetone isonicotinoylhydrazone is dissolved in 250 ml. liquid hydrogen cyanide and allowed to remain in a glass stoppered bottle at room temperature for about 10 hours. Then, after separating the unreacted hydrogen cyanide by distillation, the oily residue is scratched to induce crystallization. This crude product is recrystallized from acetonitrile to yield about 50 g. purified N-isonicotinoyl-N-(1,1 - dimethylcyanomethyl)hydrazine (M. P. 123.0–123.5° C.).

[Treatment of the free base (in absolute ethanol) with etherial hydrogen chloride yields the hydrochloride addition salt.]

EXAMPLE 2

*N-(2-furoyl)-N'-(1,1-dimethylcyanomethyl)hydrazine*

28 g. acetone 2-furoyl hydrazone is dissolved in 100 ml. liquid hydrogen cyanide and allowed to remain in a glass stoppered bottle at room temperature for about 10 hours. Then, after separating the unreacted hydrogen cyanide, the crude product is recrystallized from toluene to yield about 30.5 g. purified 1-(2-furoyl)-2-(1,1-dimethylcyanomethyl)hydrazine (M. P. 133–135° C.).

EXAMPLE 3

*N-(2-thenoyl)-N'-(1,1-dimethylcyanomethyl)hydrazine*

17.5 g. acetone 2-thenoyl hydrazone is dissolved in 100 ml. liquid hydrogen cyanide and allowed to remain in a glass stoppered bottle at room temperature for about 10 hours, at which time large rhombic crystals begin to settle out. On evaporation of the unreacted hydrogen cyanide, the crude product is obtained. Recrystallization from toluene yields about 18.4 g. purified N-(2-thenoyl)-N'-(1,1 - dimethylcyanomethyl)hydrazine (M. P. 147–148° C.).

EXAMPLE 4

*N-(isonicotinoyl-1-oxide)-N'-(1,1-dimethylcyanomethyl)hydrazine*

17 g. acetone isonicotinoyl-1-oxide hydrazone is dissolved in 100 ml. liquid hydrogen cyanide and allowed to remain in a glass stoppered bottle at room temperature for about 10 hours. The unreacted hydrogen cyanide is allowed to evaporate and the oily residue allowed to remain at 0°–10° C. to solidify. This crude product is recrystallized from 125 ml. isopropanol to yield 16.5 g. purified N-(isonicotinoyl-1-oxide)-N'-(1,1-dimethylcyanomethyl) hydrazine (M. P. 150–151° C.$_{dec.}$).

EXAMPLE 5

*N-isonicotinoyl-N'-(1-cyano-4-methylcyclohexyl)hydrazine*

27.3 g. 4-methylcyclohexanone isonicotinoyl hydrazone is dissolved in 100 ml. liquid hydrogen cyanide and allowed to remain at room temperature for about 10 hours. The unreacted hydrogen cyanide is then allowed to evaporate and the residual solid material is recrystallized from toluene to yield 19.8 g. purified N-isonicotinoyl-N'-(1-cyano - 4 - methylcyclohexyl)hydrazine (M. P. 159–161° C.).

EXAMPLE 6

*N-isonicotinoyl-N'-(1-cyano-2-methylpropyl)hydrazine*

20 g. 2-methylpropionaldehyde isonicotinoyl hydrazone is dissolved in 100 ml. liquid hydrogen cyanide and allowed to remain at room temperature for about 10 hours. The unreacted hydrogen cyanide is then allowed to evaporate. The white residue is recrystallized from 200 ml. toluene to yield about 21 g. purified N-isonicotinoyl-N'-(1-cyano-2-methylpropyl)hydrazine (M.P. 142–143° C.).

EXAMPLE 7

*N-isonicotinoyl-N'-(1-cyanothiacyclohexyl)hydrazine*

23 g. 4-thiacyclohexanone isonicotinoylhydrazone is dissolved in 100 ml. liquid hydrogen cyanide and allowed to remain at room temperature for about 10 hours. The unreacted hydrogen cyanide is decanted and the crystalline residue is recrystallized from 950 ml. 95% ethanol to yield about 18.5 g. purified N-isonicotinoyl-N'-(1-cyanothiacyclohexyl)hydrazine (M.P. 182–184° C.).

EXAMPLE 8

*N-(5-imidazolecarboxyl)-N'-(1,1-dimethyl-1-cyanomethyl)hydrazine*

A mixture of 16.6 g. acetone 5-imidazolecarboxyl hydrazone and 100 ml. liquid hydrogen cyanide is allowed to remain at room temperature for about 10 hours. The unreacted hydrogen cyanide is then allowed to evaporate. The residue is then crystallized from isopropanol to yield the purified N-(5-imidazolecarboxyl)-N'-(1,1-dimethyl-1-cyanomethyl)hydrazine.

EXAMPLE 9

*N-(5-imidazolecarboxyl)-N'-(1-cyanocyclohexyl)hydrazine*

A mixture of 20.6 g. cyclohexanone 5-imidazolecarboxylhydrazone and 100 ml. liquid hydrogen cyanide is allowed to remain at room temperature for about 10 hours. The unreacted hydrogen cyanide is allowed to evaporate. The residue is then crystallized from isopropanol to yield the purified N-(5-imidazolecarboxyl)-N'-(1-cyanocyclohexyl)hydrazine.

EXAMPLE 10

*N'-(5-imidazolecarboxyl)-N'-(1-cyano-2-methylpropyl)-hydrazine*

A mixture of 18.0 g. isobutyraldehyde 5-imidazolecarboxylhydrazone and 100 ml. liquid hydrogen cyanide is allowed to remain at room temperature for about 10 hours. The unreacted hydrogen cyanide is allowed to evaporate. The residue is then crystallized from isopropanol to yield the purified N-(5-imidazolecarboxyl)-N'-(1-cyano-2-methylpropyl)hydrazine.

EXAMPLE 11

*N-(5-imidazolecarboxyl)-N'-(1-cyanobenzyl)hydrazine*

A solution of 21.4 g. benzaldehyde 5-imidazolecarboxylhydrazone in 100 ml. dimethylformamide (or n-butanol) is saturated with hydrogen cyanide and the mixture is allowed to remain at room temperature for about 10 hours. The resulting mixture is then concentarted in vacuo and the residual solid material crystallized from isopropanol to yield the purified N-(5-imidazolecarboxyl)-N'-(1-cyanobenzyl)hydrazine.

EXAMPLE 12

*N-isonicotinoyl-N'-(1-cyanobenzyl)hydrazine*

A solution of 22.5 g. benzaldehyde isonicotinoylhydrazone in 100 ml. dimethylformamide is saturated with hydrogen cyanide and the mixture is allowed to remain at room temperature for about 10 hours. The resulting mixture is then concentrated in vacuo and the residual solid material crystallized from isopropanol to yield the purified N-isonicotinoyl-N'-(1-cyanobenzyl)hydrazine.

EXAMPLE 13

*N-isonicotinoyl-N'-(1-cyano-4-acetamidobenzyl)hydrazine*

A solution of 28.2 g. 4-acetamidobenzaldehyde isonicotinoylhydrazone in 100 ml. dimethylformamide is saturated with hydrogen cyanide and the mixture is allowed to remain at room temperature for about 10 hours. The resulting mixture is then concentrated in vacuo, and the residual solid material crystallized from isopropanol to yield the purified N-isonicotinoyl-N'-(1-cyano-4-acetamidobenzyl)hydrazine.

EXAMPLE 14

*N-isonicotinoyl-N'-cyanoglucosehydrazine*

A solution of 29.9 g. glucose isonicotinoylhydrazine in 100 ml. n-butanol is saturated with hydrogen cyanide and the mixture is allowed to remain at room temperature for about 10 hours. The resulting mixture is then concentrated in vacuo and the residual solid material crystallized from isopropanol to yield the purified N-isonicotinoyl-N'-cyanoglucosehydrazine.

EXAMPLE 15

*N-isonicotinoyl-N'-cyanostreptomycinhydrazine*

A solution of 40.5 g. streptomycin isonicotinoylhydrazine trihydrochloride in 100 ml. methanol is saturated with hydrogen cyanide, and the mixture is allowed to remain at room temperature for about 10 hours. The resulting mixture is then concentrated in vacuo, and the residual solid material is dissolved in 100 ml. water and freeze-dried to yield N-isonicotinoyl-N'-cyanostreptomycinhydrazine trihydrochloride. Treatment with silver oxide yields the free base.

This invention may be variously otherwise embodied within the scope of the appended claims.

I claim:

1. Compounds having the general formula

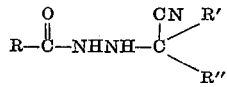

wherein R is a heterocyclic radical selected from the group consisting of pyridyl, furyl, thienyl, imidazolyl, and pyridyl-1-oxide, and each of R' and R" is a member of the group consisting of hydrogen, alkyl, hydroxy-alkyl, halo-alkyl, monocyclic aryl, and together are part of a monocyclic carbocyclic nucleus.

2. The process which comprises reacting a hydrazone of the general formula

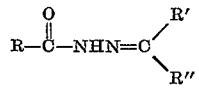

wherein R is a heterocyclic radical selected from the group consisting of pyridyl, furyl, thienyl, imidazolyl, and pyridyl-1-oxide, and each of R' and R" is a member of the group consisting of hydrogen, alkyl, hydroxy-alkyl, halo-alkyl, monocyclic aryl, and together are part of a monocyclic carbocyclic nucleus, with hydrogen cyanide, and separating the resulting product from the reaction mixture.

3. N - isonicotinoyl - N' - [1,1 - di(lower alkyl)cyanomethyl]hydrazine.

4. N - isonicotinoyl - N' - (1,1 - dimethylcyanomethyl)-hydrazine.

5. N - (2 - furoyl) - N' - [1,1 - di(lower alkyl)cyanomethyl]hydrazine.

6. N - (2 - furoyl) - N' - (1,1-dimethylcyanomethyl)-hydrazine.

7. N - (2 - thenoyl) - N' - [1,1 - di(lower alkyl)cyanomethyl]hydrazine.

8. N - (2 - henoyl) - N' - (1,1 - dimethylcyanomethyl)-hydrazine.

9. N - (isonicotinoyl - 1 - oxide) - N' - [1,1 - di(lower alkyl)cyanomethyl]hydrazine.

10. N - (isonicotinoyl - 1 - oxide) - N' - (1,1, - dimethylcyanomethyl)hydrazine.

11. N - (5 - imidazolecarboxyl) - N' - [1,1 - di(lower alkyl)cyanomethyl]hydrazine.

12. N - (5 - imidazolecarboxyl) - N' - (1,1-dimethyl-1-cyanomethyl)hydrazine.

References Cited in the file of this patent

Votocek et al.: Chem. Abst., vol. 31, col. 4959 (1937).